INVENTOR.
CHARLES H. RIPPL

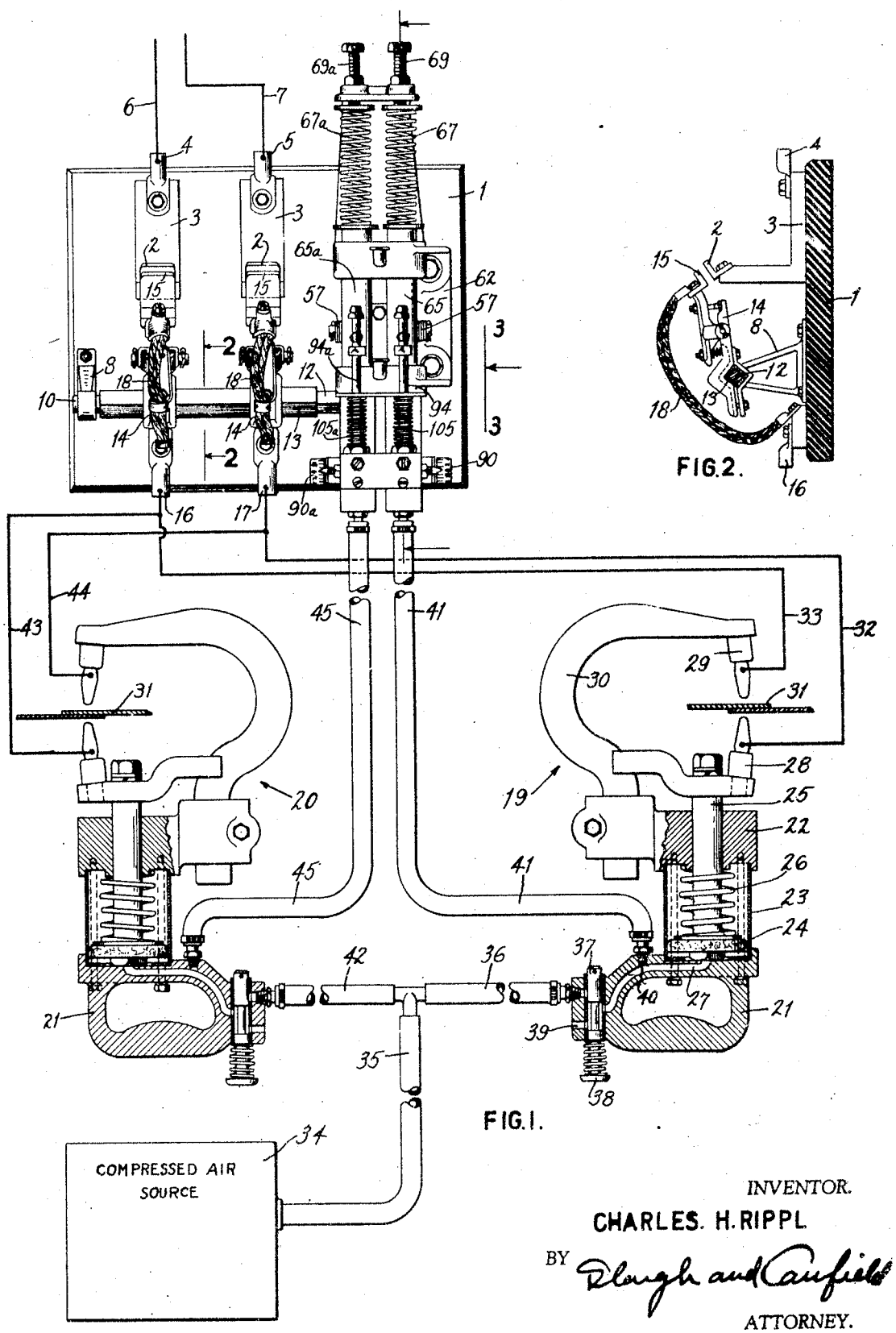

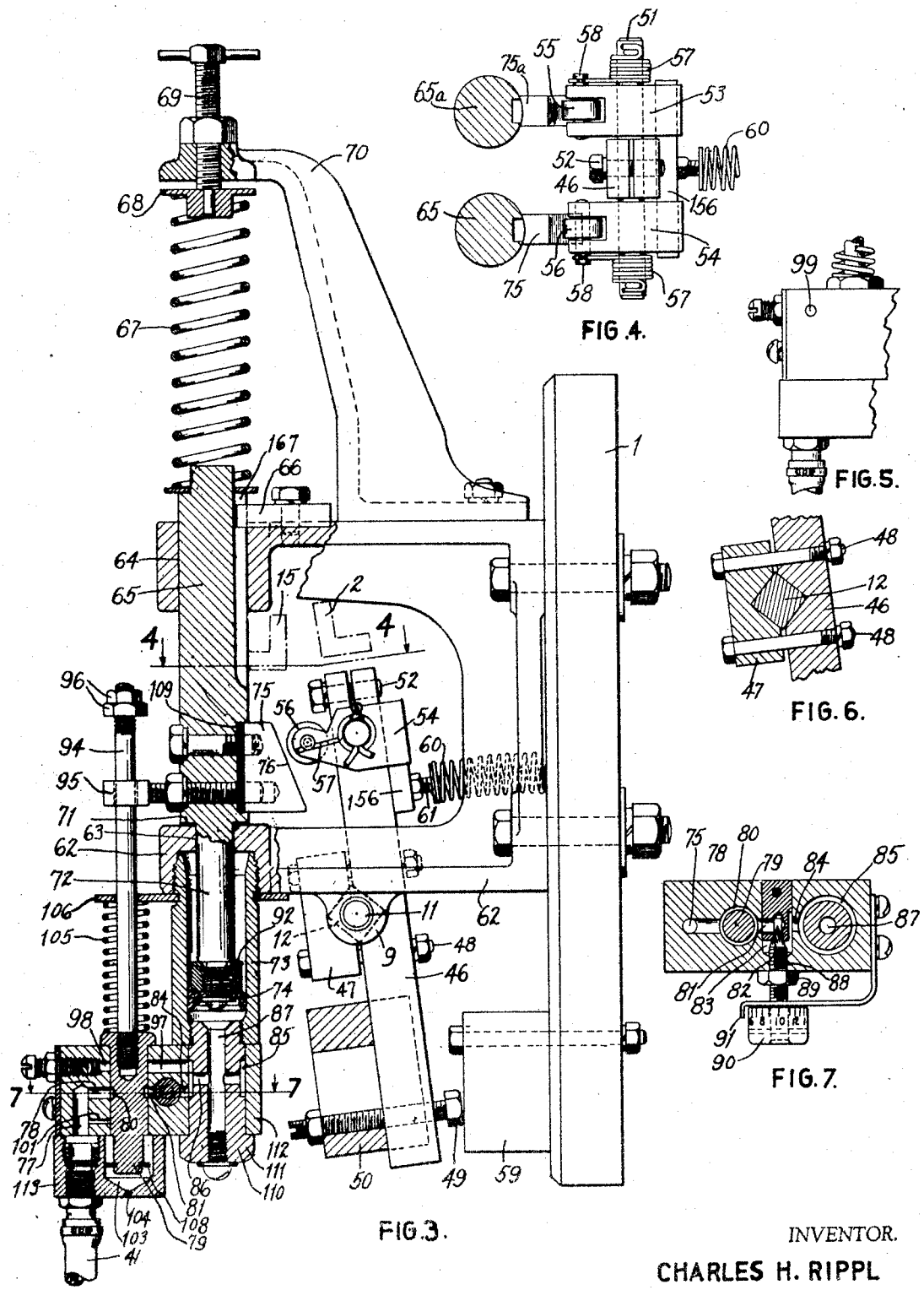

Patented Dec. 1, 1942

2,304,021

UNITED STATES PATENT OFFICE 2,304,021

WELDING CURRENT CONTROL APPARATUS

Charles H. Rippl, Cleveland, Ohio, assignor to The Clark Controller Company, Cleveland, Ohio, a corporation of Ohio Application February 7, 1936, Serial No. 62,795
Renewed July 24, 1939

21 Claims. (Cl. 219—4)

This invention relates to fluid pressure actuated electric contactors for controlling electric welding current.

In some electric welding production processes, such for example as spot welding processes, it is desirable to make different welds, sometimes in succession, with currents of different time duration. Heretofore this has required a duplication of current controlling contactors, one for timing each kind of weld; or has necessitated a re-arrangement of the production flow plan to make all of one kind of weld at one time and then re-adjust the timing apparatus for making the other kind of weld.

Also, it has been heretofore proposed to operate welding current controlling electric contactors by compressed air or other fluid pressure from the source used to operate the welding gun itself, and under the control of the gun operating valve, and while a marked degree of improvement over prior methods has thereby been attained, in some instances the electric contactor has operated ahead of the gun; and re-setting of the fluid operated apparatus after an operation of the contactor has not been sufficiently positive, quick or reliable.

It is therefore among the objects of this invention:

To provide an improved fluid pressure operated electric contactor for welding current control;

To provide, in a fluid pressure operated electric contactor for controlling welding current, an improved fluid control valve means;

To provide a welding current control apparatus having improved contactor operating means whereby a plurality of welding guns may utilize welding current controlled by a single contactor and each gun supplied thereby with current of different time duration;

To provide in a fluid pressure operated electric contactor apparatus for supplying current to a welding gun, improved means to insure operation of the gun and contactor in the desired sequence; and to insure quick re-setting of the contactor operating fluid pressure apparatus after an operation thereof.

Other objects will be apparent to those skilled in the art to which my invention appertains.

My invention is fully disclosed in the following description taken in connection with the accompanying drawings, in which:

Fig. 1 is a front elevational view, partly diagrammatic, of an apparatus embodying my invention, in a preferred form;

Fig. 2 is a fragmentary cross-sectional view taken approximately from the plane 2—2 of Fig. 1;

Fig. 3 is a side elevational view taken from the plane 3—3 of Fig. 1 with parts thereof in longitudinal section;

Fig. 4 is a cross-sectional view taken from the plane 4—4 of Fig. 3;

Fig. 5 is a fragmentary view in elevation of some of the parts of Fig. 3 illustrated in section in that figure;

Fig. 6 is a fragmentary sectional view taken on a plane parallel to the plane of the paper and illustrating some of the parts of Fig. 3 in section which are illustrated in elevation in that figure;

Fig. 7 is a cross-sectional view taken from the plane 7—7 of Fig. 3;

Figures 8, 9, 10:
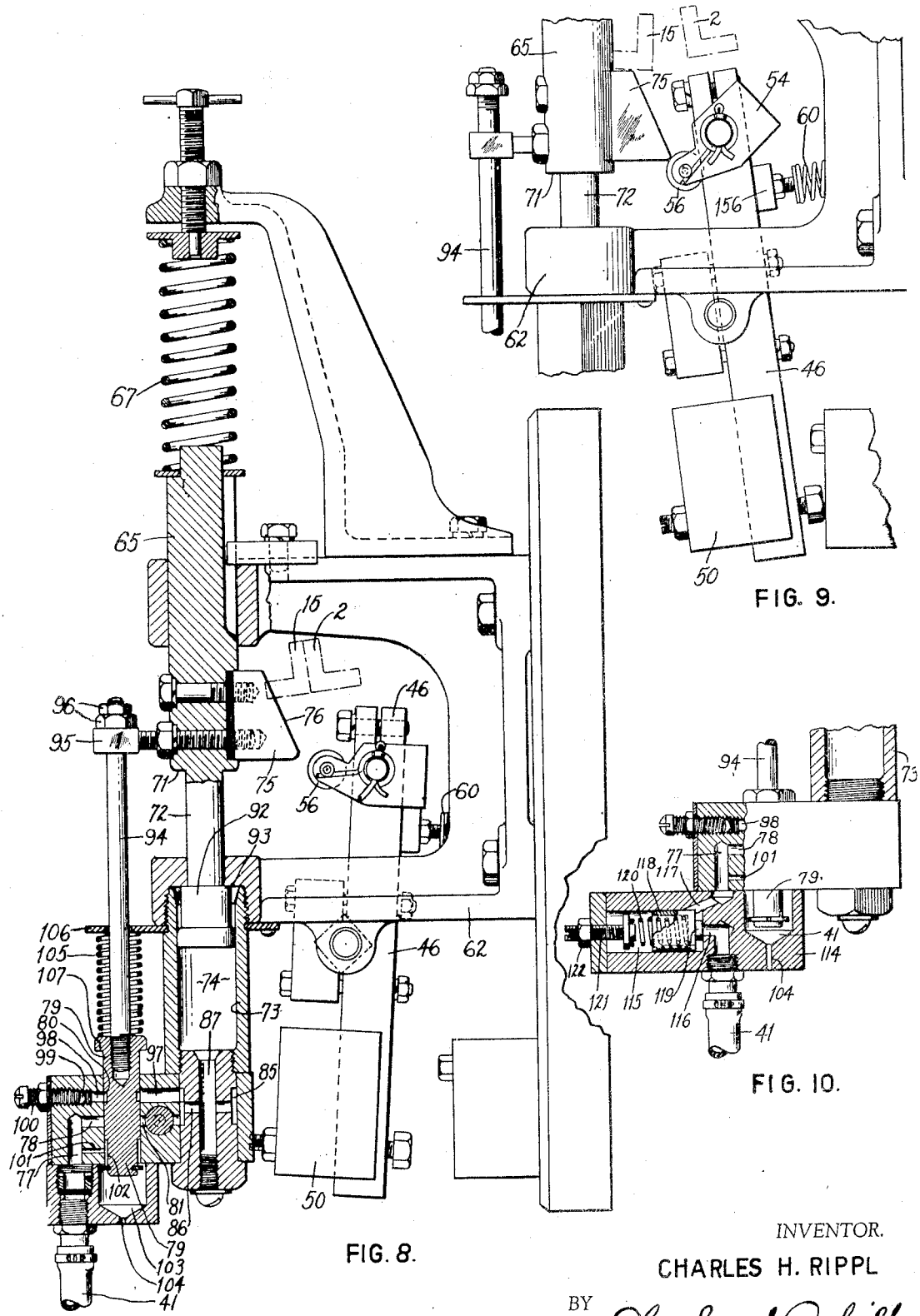
Fig. 8 is a view generally similar to Fig. 3 but illustrating parts thereof in different operative positions.
Fig. 9 is another view illustrating fragmentarily, some of the parts of Figs. 3 and 8 in other operative positions thereof.
Fig. 10 is a fragmentary view similar to a part of Fig. 3 and illustrating a modification.

Referring to the drawings, I have shown generally at 1 a panel preferably formed from insulating material upon which is mounted a two-pole electric contactor comprising stationary contacts 2—2 supported on the panel 1 by brackets 3—3 having incoming terminals 4 and 5 secured thereto to which incoming power lines 6 and 7 may be connected. On the panel 1 is mounted a pair of transversely spaced bearings 8 and 9 (Figs. 1, 2 and 3) in which are oscillatably supported opposite cylindrical ends 10 and 11 of a rectangular section shaft 12 having a sleeve of insulating material 13 thereon. Arms 14—14 are clamped upon the sleeve 13 and carry at their upper ends movable contacts 15—15, and out-going terminals 16 and 17 are mounted on the panel 1 connected to the contacts 15—15 by flexible conductors 18—18.

When the shaft 12 is oscillated by means to be described, the pairs of contacts 15—2 are engaged and current may flow from the power lines 6 and 7 therethrough and out at the terminals 16—17 in a well known manner, and the current may likewise be broken when the contacts are separated, the current flowing for the predetermined time duration that the contacts are held closed. Impulses of welding current are thus supplied at the contacts 16 and 17 to a plurality such as two welding guns, illustrated generally at 19 and 20. The guns illustrated are alike and each comprises a handle or hand grip 21 having a head 22 spaced therefrom and clamped thereto upon an intermediate housing 23 in the form of a pneumatic cylinder. A piston 24 reciprocates in the cylinder and reciprocates a piston rod 25 guided in the head 22, in the retracted direction by a spring 26 in the cylinder and in the operated direction by compressed air admitted to the cylinder through a duct 27 in the handle.

Secured to the piston rod 25 is one welding electrode 28 movable relative to another electrode 29 supported on the head 22 by a yoke 30. Work to be welded, shown at 31, is clamped between the electrodes 28 and 29 when air is admitted to the cylinder, and when the contact pairs 2—15 are closed, current will flow, say, from the terminal 17 by a wire 32 to the contactor 28, through the work 31 to the contactor 29, and thence by a wire 33 back to the terminal 16, to effect a weld at the work.

Compressed air is admitted to the cylinder 23 from a source 34 by a conduit 35 and a branch conduit 36 connected to the handle 21. A piston valve 37 in the handle, when operated by a compressible button 38, will admit compressed air from the branch conduit 36 to the duct 27 to operate the gun as described. When the valve button 38 is released, air in the cylinder 23 may flow back through the duct 27 and out through the valve at an outlet duct 39. When air is thus admitted by the valve 37 to the gun, air is also admitted from the duct 27 through a duct 40 to a conduit 41 to operate the contact pairs 2—15 by means to be described which holds the contacts closed for a predetermined impulse time interval; so that by the single operation of pressing the valve button 38, the electrodes are engaged with the work and an impulse of welding current, accurately timed, flows therethrough to make a weld.

The contactor contacts are operated as will be described, after the operation of the gun because of the time required for the back pressure in the cylinder 23 and hence in the conduit 41 to build up to a contactor contact operating value.

The gun 20 may be exactly like the gun 19 above described receiving compressed air through a branch conduit 42 and receiving current through wires 43 and 44 from the terminals 16 and 17 and admitting air to a contact-operating conduit 45.

The pneumatically operated means for closing and opening the contact pairs 15—2 will now be described. As shown in Figs. 3, 4, 5, 8 and 9, an arm 46 is rigidly secured to the rectangular shaft 12 by being clamped thereon by a clamp piece 47 and bolts 48—48, so that oscillatory movement of the arm 46 will positively oscillate the contact-carrying shaft 12. The arm 46 is stopped in one direction by an adjustable bolt 49 in the lower end thereof which adjustably clamps a weight 50 upon the lower end of the arm for inertia purposes. At the upper end of the arm 46, a stud 51 is rigidly clamped therein in a slotted opening by a screw 52 and extends in opposite directions therefrom and at each projecting end has oscillatably mounted thereon latch-form cam followers 53 and 54 having rollers 55 and 56 in bifurcated portions thereof and retained in clockwise direction as viewed in Fig. 3 against a stop 156 extending across the back of the arm 46, by springs 57—57 wound around the ends of the stud 51, anchored at one end thereto, and at the free end engaging extending head portions of shafts 58—58 upon which the rollers 55 and 56 rotate. The cam followers 53 and 54, therefore, may be individually rocked counter-clockwise as viewed in Fig. 3 and are stopped against rocking in the other direction.

The arm 46 is constrained to a counter-clockwise position to engage the stop bolt 49 with a stopblock 59 on the panel 1 by a spring 60 abutting at opposite ends upon the panel 1 and upon an adjustable screw 61 on the arm 46 above the shaft 12.

A frame 62 is secured to the panel 1 and at the forward portion thereof has aligned vertically spaced bores 63 and 64 in which reciprocates a plunger 65, held against rotation by a key 66 secured to the frame 62 and projecting into a keyway 167 in the plunger.

A compression spring 67 reacting at its lower end upon the plunger and at its upper end upon a washer 68 on the lower end of a screw 69 in an arm 70 projecting upwardly from the frame 62, yieldingly holds the plunger 65 downwardly, normally, the plunger having a shoulder 71 resting upon the frame 62 at the upper end of the bore 63. The spring 67 may be adjusted by the screw 69 to vary the spring force by which the plunger is returned downwardly to its normal downwardly stopped position, shown in Fig. 3.

The lower end of the plunger 65, where it reciprocates in the bore 63, is of reduced diameter providing the said shoulder 71 and the reduced diameter portion constitutes a piston rod 72 projecting downwardly into a tubular cylinder 73 having on its lower end a piston 74.

In a manner to be described, fluid under pressure such as compressed air is admitted to the cylinder 73 from the conduit 41 above described and thereupon the piston 74 pushes the plunger 65 upwardly against the opposing compression of the spring 67.

The plunger has thereon a cam 75 having an inclined cam face 76 which, as the plunger moves upwardly, engages the roller 56, as shown in Fig. 3, rocking the arm 46 clockwise as viewed in Fig. 3 and rotating the shaft 12. This moves the movable contactor contact 15, shown diagrammatically in Fig. 3, into engagement with the stationary contactor contact 2, the parts then being in the position shown in Fig. 8.

The cam 75 passes free of the roller 56, with a quick movement so that the motion of the arm 46 is continued due to the inertia of the weight 50. The spring 60, which may be suitably adjusted as described, quickly returns the arm 46 counterclockwise disengaging the contacts 15 and 2, the parts moving to the position shown in Fig. 9, so that the contacts remain closed for only a short interval of time determined by the inertia of the weight 50 and the tension of the spring 60.

As will be described hereinafter, the rate of admission of air to the cylinder 73 under the piston 74 may be adjustably controlled. When adjusted so as to appreciably retard the air admission, the velocity of movement of the plunger 65 will be reduced. Thus if desired, the plunger may be made to move so slowly that the contacts 15—2 will remain closed by engagement of the cam face 76 with the roller 56 for a relatively long time, substantially independently of the inertia of the weight 50. The inertia of the weight 50 is utilized when the time duration of the contact engagement is to be very short.

When the fluid pressure under the piston 74 is released, the spring 67 moves the plunger 65 downwardly rapidly, from the position of Fig. 8 to that of Fig. 3, and the cam 75 rides over the roller 56 which is now in the path of the cam by rocking the cam follower 54 as shown in Fig. 9.

The valve control for the cylinder 73 and piston 74 will now be described. With the parts in the normal position of Fig. 3, fluid such as air under pressure is admitted through the conduit 41 and passes upwardly through a vertical duct 77 and thence by a horizontal duct 78 where it encounters a vertically reciprocable piston valve 79, the air flowing around the valve in an annular groove 80 in the valve and continues through a duct 81 (see also Fig. 7), and thence around a needle valve 82 to a valve chamber 83 and duct 84, and thence to an annular groove 85 communicating with a duct 86 which opens into a vertical duct 87, the latter communicating with the lower end of the cylinder 73 below the piston 74.

The air thus flows to the cylinder under the control of the needle valve 82 so that the velocity of the plunger 65 and its cam 75 may be adjusted, the needle valve functioning as a throttle valve, and inasmuch as the velocity of the cam 75 when it engages the roller 56 will determine the extent of inertia throw as above described of the arm 46 and therefore determine the length of the time that the contacts 15—2 are closed and the length of the current duration, the current duration may be adjusted by adjusting the needle valve 82, and it therefore is rendered readily adjustable by having a threaded shank 88 threaded into the wall of the chamber 83 by which the needle valve 82 may be adjusted. A lock nut 89 is provided to fix the adjustment and the threaded shank 88 has thereon a dial head 90 cooperating with a fixed finger 91 to indicate its adjusted position. Thus, by turning the dial head 90 to various numbered dial positions, the duration of the current impulse may be adjustably changed, and indicated.

When air is admitted to the cylinder 73 as just described and the piston 74 shoves the plunger 65 upward, upward movement is stopped by a collar 92 on the piston rod engaging the frame at 93, Fig. 8. As the plunger approaches the top of its stroke, the piston valve 79 is shifted upwardly as follows. The upper end of the piston valve 79 projects upwardly and has threaded into its upper end a rod 94 which passes through an eye 95 secured to the plunger 65 and on the upper end of the rod 94 are lock nuts 96 constituting a shoulder on the rod, the lock nuts being adjustable on the rod to adjust the position of the shoulder.

The upward movement of the plunger 65, therefore, moves the eye 95 upwardly and it engages the shoulder 96 and accordingly raises the valve 79 a predetermined distance and accurately positions it when the collar 92 on the piston rod 72 engages its stop 93.

The groove 80 in the valve 79 is thereby raised and the valve 79 closes the ducts 78 and 81 so that further flow of fluid to the cylinder 73 is thereby cut off. At the same time, the groove 80 provides a discharge outlet for air in the cylinder, the air flowing downwardly through the duct 87, laterally through the duct 86, through the groove 85, into a duct 97, thence around the annular groove 80 through a duct 98, and laterally outward through an opening 99 (see also Fig. 5), which opening is adjustable in size by a screw 100 threaded into the bore of the duct 98 and partly overlapping the opening 99.

The air is forced to escape by the above described path under the impulse of the spring 67 which is forcing the plunger 65 downwardly, and by restricting the opening 99 by the screw 100, the rate of air escape can be controlled and the descent of the plunger cushioned to reduce or avoid shock when the shoulder 71 strikes the frame as above described.

The piston valve 79 is held in its upper or discharge position while the plunger is descending by air pressure supplied from the vertical duct 77 through a small duct 101, the air passing around a reduced diameter portion 102 at the lower end of the valve 79 and into a chamber 103 below the valve 79, the pressure in the chamber 103 being kept at a low value by constantly escaping through a restricted orifice 104 in the chamber wall. The pressure in the chamber 103, however, is sufficient to hold the valve 79 in its upper position, Fig. 8, so that it remains in said position after the plunger 65 descends so long as the operator holds the valve button 38, Fig. 1, depressed and continues the supply of air to the conduit 41. In other words, the operator must remove pressure from the button 38 to permit the valve 79 to reset, thus insuring a complete cycle of operations in each case.

When pressure in the chamber 103 is thus released, the piston 79 is moved downwardly by a spring 105 which is at all times pushing downwardly on the valve, the spring reacting at one end upon the valve and at the other end upon a bracket 106 secured to the frame 62. In its downward movement, the valve is stopped by a shoulder 107 on the valve.

When the valve 79 moves to its lower position, the full diameter or main portion of the valve closes the duct 101 so that the chamber 103 is restored to atmospheric pressure by the orifice 104. The valve 79 may be prevented from over-traveling upwardly by inertia by means of a pin or spring ring 108 on the lower end of the valve engaging the lower end of the wall of the bore in which the piston valve 79 reciprocates.

It will be apparent from the foregoing description that when an operator depresses a gun valve button 38 as in Fig. 1, the plunger 65 will be given an up-stroke at a predetermined controlled velocity which will close the contactor contacts 2 and 15 for a predetermined length of time to give a welding current impulse to the welding gun, and the plunger 65 will immediately return to its down position, the movement of the plunger 65 operating the valve 79 to change it from the air intake to the air exhaust position and the valve 79 will remain in its operated position until the operator takes his hand off from the gun button 38.

As will be observed in Fig. 1, two plungers 65 and 65a are shown and accompanying each plunger are corresponding parts such as those described for the plunger 65, both sets of parts being supported on the common bracket 62 and both plungers operating to move the common contactor-operating arm 46 on the shaft 12, the plunger 65 operating the contactor by air admitted through the conduit 41 for the gun 19 and the plunger 65a operating the same contactor contacts by air admitted through the conduit 45 to supply current to the gun 20.

In each case, the contactor will not be operated until the pressure in the conduits 41 or 45, has built up which occurs after the electrodes of the gun have engaged the work and the pressure in the gun cylinder has accordingly built up.

The velocities of the two plungers may be adjusted as above described so that when one plunger operates it will produce a current impulse of one time duration and when the other plunger is operated it will produce a current impulse of a different time duration under the control of the same contacts 2—15. Therefore, in doing production work, an operator may operate the gun 19 to produce, say, short time spot-welds, and for a long-time spot-weld may lay that gun down and pick up the gun 20 and perform such welds with it. Thus, welds of different current time duration may be performed one after the other without a transfer of the work from one station to another in the plant or production line and utilizing a single pair of contactor contacts and a single panel supporting the same.

As a further means of adjusting the duration of the current time, the cam 75 is rendered adjustable by being formed separately from the plunger 65 and projecting laterally therefrom and having a plurality of shims 109 between the cam and the plunger to position it farther from or nearer to the line of motion of the plunger so that it will engage the roller 56 earlier or later in its upward travel.

As stated above, there are two cams 75 and 75a (see Fig. 4), one for each plunger 65 and 65a, and these may be adjusted separately and differently if desired by shims such as the shim 109 shown in Fig. 3 in connection with the cam 75.

The entire valve control above described may be constructed as a unit to adapt it to be removed and replaced if desired for the usual purposes, and one such unitary construction is illustrated in Figs. 3 and 8. The cylinder 73 is screw-threaded at its upper end into the frame 62 and into its lower end is screw-threaded a plug 110 having therein the ducts 87, 88 and the annular groove 85. A head 111 on the plug 110 clamps, between it and the lower end of the cylinder 73, a housing 112 in which are formed the ducts 84, 81, 97, 98, 101, 75 and 78, as well as a bore for the valve 78. A supplemental housing 113 secured to the lower side of the housing 112 provides the chamber 103 and a receptacle for the end of the conduit 41. A bracket 106 may be clamped between a shoulder on the upper end of the cylinder 73 and the lower side of the housing 62.

In Fig. 10 I have illustrated a modification of the valve control which it may be desirable to employ in some cases for the following reasons. In some instances, because of the sluggish movement of the plungers 25 of the gun 19 or 20 and the pressure of the compressed air source and the necessary length of the conduit 41 or 45, the contactor operating plunger 65 or 65a may be operated more rapidly, that is to say, ahead of the operation of the gun to engage the electrodes 28—29 with the work 31; or, the contacts 15—2 may be initially engaged before initial engagement of the electrodes with the work. The obvious remedy would be to increase the resistance or downward force of the spring 67 opposing movement of the plunger 65 to delay its movement until greater pressure had built up in the cylinder 73 to insure operation of the gun before the contactor. But this would introduce another difficulty, namely, that with such a powerful spring 67, its force would rapidly increase when it was further compressed by upward movement of the plunger 65 so as to make the movement of the plunger sluggish and deprive it of the necessary surplus of energy to reliably operate the contactor operating arm 46 with the desired quick positive action. Resort would then have to be had to an increase of size of the cylinder 73 and then the original difficulty of too quick an operation of the plunger 65 would again be present and so on.

By utilizing the modification of valve control illustrated in Fig. 10, admission of air to the cylinder 73 is delayed until a predetermined pressure at the valve control, or adjacent the admission end of the cylinder 73, has been attained, such pressure being sufficiently high to insure that the gun electrodes have engaged the work, and to insure positive movement of the plunger 65 at not less than a certain predetermined velocity and this will now be described.

The supplemental housing 113 of the first described form is in this form increased in horizontal extent toward the left as viewed for example in Fig. 3 of the other form and is indicated at 114. A preferably but not necessarily horizontal cylinder 115 is provided in the housing 114 and the conduit 41 communicates with the inner end thereof by a duct 116, substantially at the axis of the cylinder 115. A duct 117 also communicates at one end with the cylinder 115 radially laterally of the point of communication therewith of the duct 116, the duct 117 communicating at its other end with the above described vertical duct 77.

A cup-form piston 118 is reciprocable in the cylinder 115 and has extending axially from the closed end thereof a small diameter portion 119 functioning normally as a valve to seat upon and close the open end of the duct 116. A spring 120 projecting into the piston 118 reacts thereon at one end to normally hold the valve portion 119 in seated position and reacting at the other end upon the inner end of an adjusting screw 121 projecting into the end of the cylinder 115, and adjustable to vary the tension of the spring 120, the adjustment being fixed by a lock nut 122.

In operation of this modification, when the gun valve button 38 is depressed to admit air to the gun, the same pressure is applied to the conduit 41 but does not immediately pass into the vertical duct 77 to operate the plunger 65 as above described, being stopped at the valve portion 119 sealing the duct 116. The pressure rapidly builds up and ultimately is sufficient to operate the gun to engage its electrodes with the work 31. At this time the increasing pressure has reached a value in the duct 116 sufficient to remove the valve portion 119 therefrom against the tension of the spring 120, and immediately thereafter the larger area of the entire end of the piston 118 is exposed to that pressure and the piston 118 is quickly retracted against the spring tension, opening the duct 117 to the pressure of the compressed fluid in the conduit 41 and operating the plunger 65 as above described.

By this means, the spring 120 can be adjusted to cause the piston 118 to be moved either slightly before, or at, or slightly after the engagement of the electrodes of the gun with the work, and it is thus insured that the electrodes will be engaged with the work when the current controlling contacts engage; and since pressure is not admitted to the cylinder 73 until the moment when it is desired to have the plunger 65 moved, the spring 67 resisting movement of the plunger need not be a powerful spring with the disadvantages of such springs above described, but, in fact, may be only strong enough to quickly and positively return the plunger 65 to its normal position after operation thereof, which includes of course rocking of the cam followers 53 and 54; and by these means, when the plunger starts to move it will always move with a positive movement and at a velocity not less than that corresponding to the pressure required to move the piston 118; and as a further result, the duration of the current impulse effected by closing of the contacts 2—15 will never be greater than a predetermined maximum.

The operation of the other elements of the valve control of Fig. 10, it will be understood, is otherwise the same as that of the control illustrated and described in connection with Figs. 3 and 8.

My invention is not limited to the exact details of construction shown and described. Changes and modifications may be made within the spirit of my invention without sacrificing its advantages and within the scope of the appended claims. To illustrate, the valve control comprising the housing 112 and the supplemental housing 113 or 114 is illustrated as composed of pieces of block-form secured together, but such valve control may all be assembled in a cast-form housing of radically different appearance and with a different arrangement of the various ducts therein but performing the same functions as are performed by the form illustrated and described.

Subject matter illustrated and described herein but not claimed is claimed in the co-pending application of Edward G. Beiderman, Serial Number 84,981, filed June 13, 1936, for Improvements in time controlled electric switches, and in my co-pending application, Serial Number 167,636, filed October 6, 1937, for Improvements in fluid pressure operated apparatus, to which reference is hereby directed.

I claim:

1. In a welding current control contactor of the type comprising a stationary contact and a movable contact, an oscillatably supported element connected to the movable contact to move it to engage and disengage the contacts and means normally constraining it to move to contact-disengaged position, a plurality of fluid pressure cylinder and piston type devices having each a pressure movable element, mechanism means operable by movement of either pressure moved element in one direction to move the oscillatably supported element to engage the contacts and to then permit it to return to contact-disengaged position, and maintaining the contacts engaged for a time period proportional to the velocity of the movable element, a source of fluid at a predetermined pressure, separate conduit means for conducting fluid under pressure to each of the cylinders of the piston and cylinder devices, a corresponding plurality of valve means each for admitting and cutting off flow of fluid from the source through the separate conduit means to one of the cylinders of the cylinder and piston devices, and means separate from said valve means to adjustably fix the rate of admission to one cylinder relative to another, to adjustably fix the relative velocities of the corresponding movable elements and thereby adjustably fix the time duration of engagement of the contacts.

2. The combination described in claim 1 and in which the said air admission adjustment means comprises a flow throttle valve in the conduit means to each cylinder operable to vary the flow rate by rotating it and a dial type means for indicating the adjusted position of each throttle valve, to indicate the time duration of engagement of the contacts.

3. In a fluid pressure actuated device for operating the contacts of a welding-current-control contactor, a fluid pressure chamber, a contact operating movable element movable by fluid pressure in the chamber, and biased to return to a normal position upon release of pressure in the chamber, a source of fluid pressure, conduit means communicating with the source and with the chamber, an operable valve controlling the conduit means to admit fluid to the chamber, a cut-off valve controlling flow in the conduit means, means rendering the cut-off valve operable by a pressure-effected movement of the pressure movable element to cut off fluid pressure from the chamber to permit the pressure movable element to return to normal position independently of the operable valve, and means to maintain the cut-off valve operated so long as the operable valve is maintained operated.

4. In a fluid pressure actuated device for operating the contacts of a welding-current-control contactor, a fluid pressure chamber, a contactor operating movable element movable by fluid pressure in the chamber, and biased to return to a normal position upon release of pressure in the chamber, a source of fluid pressure, conduit means communicating with the source and with the chamber, an operable valve controlling the conduit means to admit fluid to the chamber, a cut-off valve controlling flow in the conduit means, means rendering the cut-off valve operable by a pressure-effected movement of the pressure movable element to cut off fluid pressure from the chamber, means for applying fluid pressure from the source under control of the operable valve to hold the cut-off valve in operated position until the operable valve is restored and means to then restore the cut-off valve.

5. In a fluid pressure actuated device for operating the contacts of a welding-current-control contactor, a fluid pressure chamber, a contact operating movable element movable by fluid pressure in the chamber, and biased to return to a normal position upon release of pressure in the chamber, a source of fluid pressure, conduit means communicating with the source and with the chamber, an operable valve controlling the conduit means to admit fluid to the chamber, a cut-off valve, controlling flow of fluid to and from the chamber and biased to take up a normal flow position, a connection between the pressure movable element and the cut-off valve to move it to an operated position to cut off fluid pressure to the chamber and to open an exhaust outlet from the chamber to permit the pressure movable element to return to normal position, and fluid pressure operated means to hold the cut-off valve in operated position under control of the operable valve.

6. In a fluid pressure actuated device for operating the contacts of a welding-current-control contactor, a fluid pressure chamber, a contact operating movable element movable by fluid pressure in the chamber, and biased to return to a normal position upon release of pressure in the chamber, a source of fluid pressure, conduit means communicating with the source and with the chamber, an operable valve controlling the conduit means to admit fluid to the chamber, a cut-off valve, controlling flow of fluid to and from the chamber, biased to take up a normal flow position, a connection between the pressure movable element and the cut-off valve to move it to an operated position to cut off fluid pressure to the chamber and to open an exhaust outlet from the chamber to permit the pressure movable element to return to normal position, a valve chamber, conduit means controlled by the cut-off valve communicating pressure to the valve chamber from the source upon operation of the cut-off valve, and the cut-off valve being held in cut-off position by pressure in the valve chamber under control of the operable valve.

7. In a fluid pressure actuated device for operating the contacts of a welding-current-control contactor, a fluid pressure chamber, a contactor operating movable element movable by fluid pressure in the chamber and biased to return to a normal position upon release of pressure in the chamber, a source of fluid pressure and conduit means communicating with the source and with the chamber, an operable valve controlling the conduit means to admit fluid pressure to the chamber, a piston valve in the line of the conduit means having a normal fluid pressure admitting position, a connection between the pressure movable element and the valve to move it to a cut-off position, an outlet conduit means from the pressure chamber normally closed by the piston valve and opened upon movement thereof to cut-off position, to permit the pressure movable element to return to normal position, a valve chamber communicating with one end of the piston valve, conduit means for communicating fluid pressure to the valve chamber upon movement of the valve to cut-off position, a restricted constantly open escape port from the chamber to effect holding of the cut-off valve in cut-off position so long as the operable valve is maintained operated and to permit it to be relieved through the escape port to reset the cut-off valve when the operable valve is restored.

8. In a fluid pressure actuated device for operating the contacts of a welding-current-control contactor, a fluid pressure chamber, a contact operating movable element movable at different velocities by fluid in the chamber at various pressures in a range of pressures and biased to return to a normal position upon the release of pressure in the chamber, a source of fluid pressures variable over said range of pressures, conduit means communicating with the source and with the chamber, an operable valve controlling the conduit means to admit fluid to the chamber, a cut-off valve controlling flow in the conduit means, means rendering the cut-off valve operable by a pressure-effected movement of the pressure movable element to cut off fluid pressure from the chamber to permit the pressure movable element to return to normal position independently of the operable valve, means to maintain the flow control valve operated so long as the operable valve is retained operated, and a yieldable normally closed valve in the line of the conduit means responsive to open to admit fluid pressure to the chamber to move the movable element, only at fluid pressure above the minimum pressure of said range to insure movement of the movable element at velocities above a minimum velocity.

9. In a fluid pressure actuated device for operating the contacts of a welding-current-control contactor, a fluid pressure chamber, a contactor operating movable element, movable at different velocities by fluid in the chamber at various pressures in a range of pressures, a source of fluid pressure variable over said range of pressures, conduit means communicating with the source and with the chamber, an operable valve controlling the conduit means to admit fluid to the chamber, a cut-off valve controlling flow in the conduit means, means rendering the cut-off valve operable by a pressure-effected movement of the pressure movable element to cut off fluid pressure from the chamber, means for applying fluid pressure from the source under control of the operable valve to hold the cut-off valve in operated position until the operable valve is restored and means to then restore the cut-off valve, and a yieldable normally closed valve in the line of the conduit means responsive to open to admit fluid pressure to the chamber to move the movable elements, only at fluid pressure above the minimum pressure of said range to insure movement of the movable element at velocities above a minimum velocity.

10. In an electric contactor mechanism, an electric contactor, an electric circuit controlled thereby, a fluid pressure chamber, an element movable upon application of pressure to the chamber, mechanism actuated by movement of the movable element to first effect closing and then effect opening of the electric contactor to effect a current impulse in the circuit of duration commensurable with the velocity of the movable element, the movable element being capable of moving at different velocities commensurable with different pressures in the chamber, a fluid pressure source at variable pressure, operable valve means and conduit means controlled thereby for effecting communication of pressure from the source to the chamber, and automatic valve means responsive to fluid pressure to control the admission of pressure to the chamber to prevent admission thereof except at pressures above a predetermined minimum to insure the effecting of current impulses in the circuit of duration below a predetermined maximum.

11. In an electro-pneumatic mechanism, an electric contactor, an electric circuit controlled thereby, a fluid pressure chamber, an element movable upon application of pressure to the chamber, mechanism actuated by movement of the movable element to first effect closing and then effect opening of the electric contactor to effect a current impulse in the circuit of duration commensurable with the velocity of the movable element, the movable element being capable of moving at different velocities commensurable with different pressures in the chamber, a fluid pressure source, a pneumatic apparatus, operable valve means and conduit means controlled thereby to effect communication of source fluid pressure to the apparatus, the apparatus comprising means energized by the said electric circuit and comprising means at which fluid pressure rises, conduit means communicating the said rising pressure to the said chamber, and automatic valve means responsive to said rising fluid pressure to control the admission of said pressure to the chamber to prevent admission thereof except at pressures above a predetermined minimum to insure the effecting of current impulses in the circuit of duration below a predetermined maximum.

12. The mechanism described in claim 10 and in which the automatic valve means comprises a port in the line of the line of the conduit means to the chamber and a valve spring-pressed in the direction to normally close the port and yieldable at pressures above the predetermined minimum to open the port.

13. In a fluid pressure actuated electric contactor mechanism, operable contactor contacts, a fluid pressure chamber, an element movable by fluid pressure in the chamber to operate the contacts, a source of fluid pressure, conduit means for conducting fluid under pressure from the source to the chamber, an operable valve operable to admit fluid pressure from the source to the chamber, a control valve to admit pressure from the conduit means to the chamber, means causing the control valve to operate upon pressure effected movement of the movable element to reduce the fluid pressure in the chamber, and means to maintain the valve operated so long as the operable valve remains operated.

14. In a fluid pressure actuated electric contactor mechanism, operable contactor contacts, a fluid pressure chamber, an element movable by fluid pressure in the chamber to operate the contacts, a source of fluid pressure, conduit means for conducting fluid under pressure from the source to the chamber, an operable valve operable to admit fluid pressure from the source to the chamber, a control valve to admit pressure from the conduit means to the chamber, means causing the control valve to operate upon pressure effected movement of the movable element to reduce the fluid pressure in the chamber, and means operable responsive to source fluid pressure in the conduit means to maintain the valve operated so long as the operable valve remains operated.

15. In a fluid pressure actuated electric contactor mechanism, operable contactor contacts, a fluid pressure chamber, an element movable by fluid pressure in the chamber to operate the contacts, a source of fluid pressure, conduit means communicating source pressure to the chamber, a control valve to admit pressure from the conduit means to the chamber, means causing the control valve to operate upon pressure effected movement of the movable element to reduce the fluid pressure in the chamber and means operable responsive to source fluid pressure in the conduit means to maintain the valve operated.

16. In a fluid pressure actuated electric contactor mechanism, an electric contactor comprising operable contacts, a fluid pressure chamber, an element movable by fluid pressure in the chamber at velocity commensurable with the pressure, a mechanism actuated by movement of the movable element to effect operation of the contactor contacts and maintain them operated for a time period commensurable with the velocity of the movable element, a source of variable fluid pressure, valve controlled conduit means to admit pressure of the source to the chamber, automatic valve means responsive to fluid pressure to control the admission of pressure to the chamber to prevent admission thereof except at pressures above a predetermined minimum to insure movement of the movable element at velocity above a predetermined minimum thereby insure operation of the switch for a time period below a predetermined maximum.

17. The contactor mechanism described in claim 10 and in which the automatic valve means comprises a valve port normally closed by a spring-pressed valve and comprises means to cause a quick port-opening movement of the valve when the fluid pressure is above the said predetermined minimum.

18. The contactor mechanism described in claim 10 and in which the automatic valve means comprises a valve port and a spring-pressed piston valve of greater transverse area than the port and covering the port and the valve is moved to open the port at fluid pressure above the said predetermined minimum and thereupon it exposes the valve to the fluid pressure to effect a quick opening movement of the valve.

19. In an electric contactor mechanism, an electric contactor, an electric circuit controlled thereby, a fluid pressure chamber, an element movable upon application of pressure to the chamber, mechanism actuated by movement of the movable element to first effect closing and then effect opening of the electric contactor to effect a current impulse in the circuit of duration commensurable with the velocity of the movable element, the movable element being capable of moving at different velocities commensurable with different pressures in the chamber, a fluid pressure source at variable pressure, operable valve means and conduit means controlled thereby for effecting communication of pressure from the source to the chamber, and automatic valve means responsive to fluid pressure to control the admission of pressure to the chamber to prevent admission thereof except at pressures above a predetermined minimum to insure movement of the movable element at velocities above a predetermined minimum velocity.

20. In an electric welding equipment, a welder having relatively movable electrodes arranged in an electric circuit, a fluid pressure supply line, means for introducing fluid under pressure from the supply line into the welder, means responsive to the fluid under pressure to relatively move the electrodes into engagement with the work, air pressure supply and distributing lines normally out of communication with each other, a switch communicating with the distributing line and located in the circuit to the electrodes to control said circuit, a valve controlling communication between said air lines and movable to open position by the fluid pressure flowing through the first named fluid supply line to the welder to effect an operation of the switch to close the circuit to the electrodes, means responsive to the fluid pressure supplied to the switch from the air distributing line to open the switch in timed relation to closing of the circuit, and adjustable means for regulating the last named means to control the time interval between closing and opening said circuit by the switch.

21. In electric welding equipment, a welder having relatively movable electrodes arranged in an electric circuit, means for introducing fluid under pressure into the welder, means responsive to the fluid under pressure to relatively move the electrodes into engagement with the work, fluid pressure supply and distributing lines normally out of communication with each other, a switch communicating with the distributing line and located in the circuit to the electrodes to control said circuit, a valve controlling communication between said lines and movable to open position by the fluid pressure supplied to the welder to effect an operation of the switch to close the circuit to the electrodes, means responsive to the fluid pressure supplied to the switch from the distributing line to open the switch in timed relation to closing of the circuit, and means also responsive to the fluid pressure supplied to the switch by the distributing line to exhaust the fluid pressure from the switch after the circuit is opened by the latter.

CHARLES H. RIPPL.